United States Patent
Jovanovich

(10) Patent No.: US 7,923,962 B2
(45) Date of Patent: Apr. 12, 2011

(54) SYSTEM OF WIRELESS ELECTRONIC REGISTRATION PLATES

(76) Inventor: Vladimir Jovanovich, Rijeka (HR)

(*) Notice: Subject to any disclaimer, the term of this patent is extended or adjusted under 35 U.S.C. 154(b) by 972 days.

(21) Appl. No.: 10/590,320

(22) PCT Filed: Oct. 26, 2004

(86) PCT No.: PCT/HR2004/000041
§ 371 (c)(1),
(2), (4) Date: Jun. 13, 2007

(87) PCT Pub. No.: WO2005/082671
PCT Pub. Date: Sep. 9, 2005

(65) Prior Publication Data
US 2007/0285361 A1 Dec. 13, 2007

(30) Foreign Application Priority Data
Feb. 26, 2004 (HR) .............................. P 20040189 A

(51) Int. Cl.
*H02J 7/00* (2006.01)
(52) U.S. Cl. ........................................ 320/101; 340/933
(58) Field of Classification Search .................. 320/101
See application file for complete search history.

(56) References Cited

U.S. PATENT DOCUMENTS

| | | | |
|---|---|---|---|
| 5,105,179 A * | 4/1992 | Smith | 340/468 |
| 5,751,257 A * | 5/1998 | Sutherland | 345/1.2 |
| 6,448,889 B1 | 9/2002 | Hudson | |
| 6,628,209 B1 * | 9/2003 | Rother | 340/933 |
| 6,641,038 B2 * | 11/2003 | Gehlot et al. | 235/384 |
| 7,142,104 B1 * | 11/2006 | Blueford | 340/472 |

OTHER PUBLICATIONS

Office Action (CN Application No. 200480042158.X) dated Apr. 4, 2008 with an English translation.

* cited by examiner

*Primary Examiner* — Edward Tso
*Assistant Examiner* — Ramy Ramadan
(74) *Attorney, Agent, or Firm* — Nixon Peabody LLP; Jeffrey L. Costellia

(57) ABSTRACT

The system of wireless electronic registration plates which is comprehended by the existance of the central wireless module placed within the motor vehicle and connected on to an electric energy source, and the wireless electronic registration plates, that are placed at the front and the rear sides of a motor vehicle, containing built-in satellite wireless module is functioning on a principle of wireless micro network where the data transfer from a computer or other mobile device for data input is made through the central wireless module to the satellite wireless modules embedded into the registration plates. The wireless electronic registration plates have its own source of electric energy which are connected to a thin, film battery implanted in to the solar housing of the registration plates. The registration data is displayed through an active display.

16 Claims, 3 Drawing Sheets

SYSTEM OF WIRELESS ELECTRONIC REGISTRATION PLATES

DESCRIPTION OF THE INVENTION

1. Technical Field to which the Invention Relates

The present invention relates to wireless electronic registration plates for all transportation means (all motor vehicles, vessels and air transportation means) for which it is customary to have registration plates, or license plates, by use of new technological materials and electronic equipment for data input and display, and alteration of registration information. In accordance with International Patent Classification (IPC) this invention is classified under international class: B60R13/10B—registration plates.

2. Background Art of the Invention

At present, the registration plates that are in use worldwide, especially with the motor vehicles, are characterized by some of the biggest drawbacks such as: unpractical process of production, delivery, fitting and substitution of the registration plates. In particular, the existing solutions for protection against the theft and misuse of the registration plates are poor and inadequate. Diversity of used materials, dimensions, designs, contents and technology used for displaying the registration information varies for each country and it is reflected through different quality of final product, which additionally complicates and prolongs the whole process of registration.

RELEVANT STATE OF THE ART

Nowadays, the motor vehicles worldwide have been using registration plates made of metal or various alloys which are mechanically attached or mounted on to a front and rear part of the vehicle body. There have been numerous solutions provided as how to fix the plates in a most simple and practical way mostly by using prefabricated or, a car factory produced vehicle registration plate receiving portions that the registration plates are then mounted on. The registration plates are made mostly of metal or various alloys with a protective layer on the surface but are still exposed to various atmospheric (humidity, high and low external temperatures) and mechanical or physical factors, which shorten its durability. Some solutions provide for different variant of mostly mechanical protection, theft, and misuse which however, are not widely used on the market. Also, there are solutions for displaying the registration information mostly by use of LCD or TFT displays where there have been presented designs for more complex format of the plates as well as more detailed presentation of additional information to be used in a traffic. However, relatively high production costs, bulky design and improper safety and security protection make these solutions unpractical for wide market application.

With other transportation means (railway, vessels, aircrafts) the existing solutions are even more modest and they are based on use of registration signs that are mechanically mounted on or, are directly applied on to a body surface by use of various paints suitable for such a purpose.

DISCLOSURE OF THE INVENTION

Primary goal of the present invention is to produce the registration plates of good quality using the most advanced technological material.

Secondary goal of the present invention is to simplify the registration process by use of wireless transfer and data input as to display the information on registration plates.

Next goal of the present invention is to prevent and make impractical the theft and misuse of the registration plates as well as to facilitate control and surveillance of all transportation means using a continuous wireless network.

Next goal of the present invention is to provide independent electricity supply for electronics used in the registration plates by application of the newest solutions in solar energy technology. These, as well as other goals and advantages of the present invention will be described in more detailed form in further text below.

In accordance with the present invention, wireless electronic registration plates shall be made by application of the most advanced technology and the material that is already patented and known as E-Ink or E-paper. The main characteristic of this material is that allows for any kind of written information (numerical, alphabetical, drawing and image design) to be electronically entered and displayed on it and, if needed, changed or corrected in a simple way. E-Ink/B-paper technology allows for black and white s well as colored display of information. Quality of displayed information on E-ink or E-paper as well as other characteristics is manifoldly better in relation to existing solutions, including LCD displays and other electronic displays that are on the market today. Energy consumption while using this type of material is significantly lower in relation to all other existing materials available today on the market.

Further advantage of this material is that it is extremely thin (functional part without electronic layer is only 0.3-0.5 mm thick), flexible and it can be applied on practically any surface. In present invention, this material shall be used for production of the registration plates, in such a way that it shall be sandwiched in or laminated with transparent plastic or similar material and attached to a non corrosive or similar base, in dimensions which are legally approved and accepted by each concerned country.

Two variants for mounting of the present registration plates are proposed. First, direct attachment/fixing of the prefabricated plates on to the body of the transportation means in a region where the registration plates are normally positioned (for example, motor vehicles/automobiles—front and rear part of the vehicle body and bumpers, vessels—side, bow part etc.). With motor vehicles specifically, the most ideal approach would be for each motor vehicle/automobile producer to carry out direct i.e. in-built mounting on to a vehicle body or bumpers or, affixing i.e. gluing on to a surface in accordance with a model and/or design of the concerned vehicle. Second or, transitional variant, for the motor vehicles using existing registration plates, consist of affixing/gluing the present plates on to existing plate holders. In both variants, the registration plates have built in an active electronics for regulation and control of the displayed information, solar cell for direct supply of electronics (thin film/power film panel) and chip for wireless communication (Bluetooth) between a source of data input (table computer, portable PC, notebook, or any other electronic device for data input) and the registration plates. Once effectuated the displayed information is practically static and there is no need for additional energy to keep it displayed and the energy consumption is minimal, therefore small solar cells can be used for such a purpose. The solar cells would provide enough energy for continuous supply of wireless chip, display and other electronics used during the process of data input, change and update.

Communication between the plates, central chip in a vehicle and the source of data input is effectuated through wireless technology (wireless/Bluetooth) and based on principles of micro i.e. Piconet networks (Master/Slave relationship). For the purposes of data input and updating of the display information software that contains all information about dimensions, design and other characteristics specific to concerned country is used. By use of portable computer/notebook or other electronic equipment for data input, and after the selection of specific type of the registration plates, dimensions, insignia and additional required information the wireless data transfer through Bluetooth chip is made directly on to the registration plates.

BRIEF DESCRIPTION OF THE DRAWINGS

The drawing figures, which are the integral part of the present invention, and which are not to scale, and which are merely illustrative, and wherein like reference characters denote similar elements throughout the several views, show an example of the way of carrying out and application of the invention. The drawing figures also show basic principles of data input, change and control of displayed information and method of theft and misuse protection of the registration plates.

DETAILED DESCRIPTION OF AT LEAST ONE WAY OF CARRYING OUT THE INVENTION BY REFERENCE TO THE DRAWINGS

The present invention will now be described in details by way of example of one way of carrying out the invention and with reference to the accompanying drawings.

Figure 1:
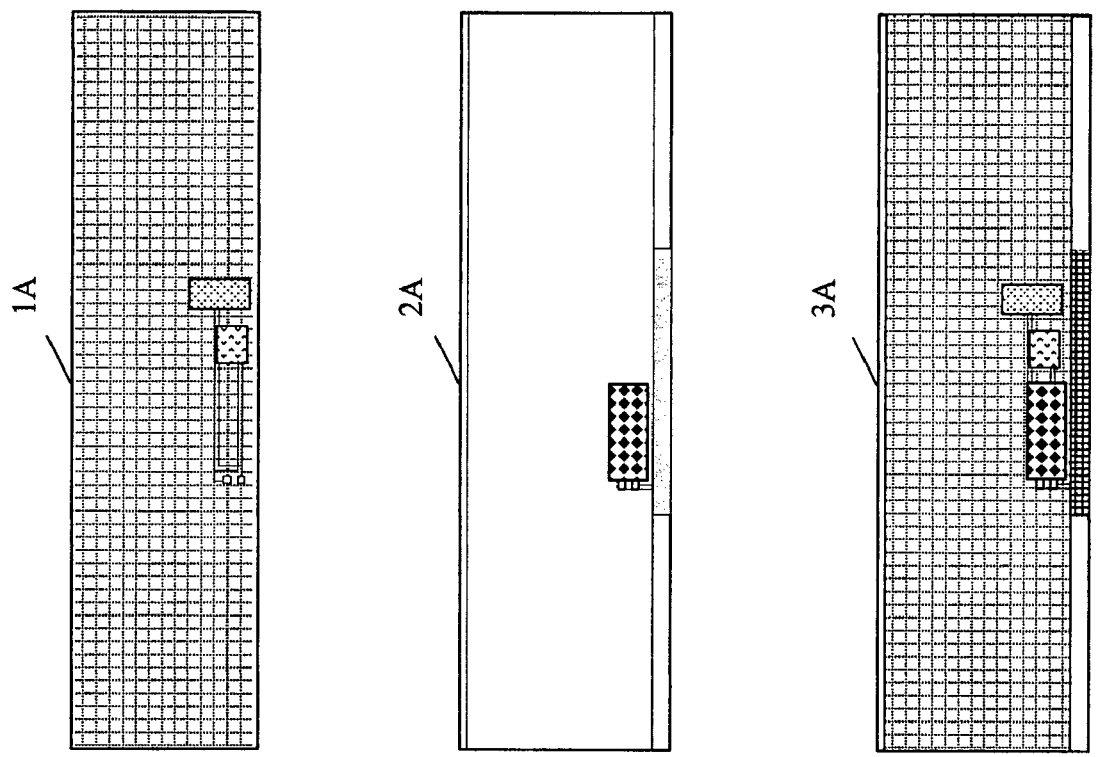
FIG. 1. shows schematic views of an embodiment of the wireless electronic registration plate consisting of front and rear view of active display, front and rear view of solar housing and fully assembled wireless electronic registration plate.
Figure 1:
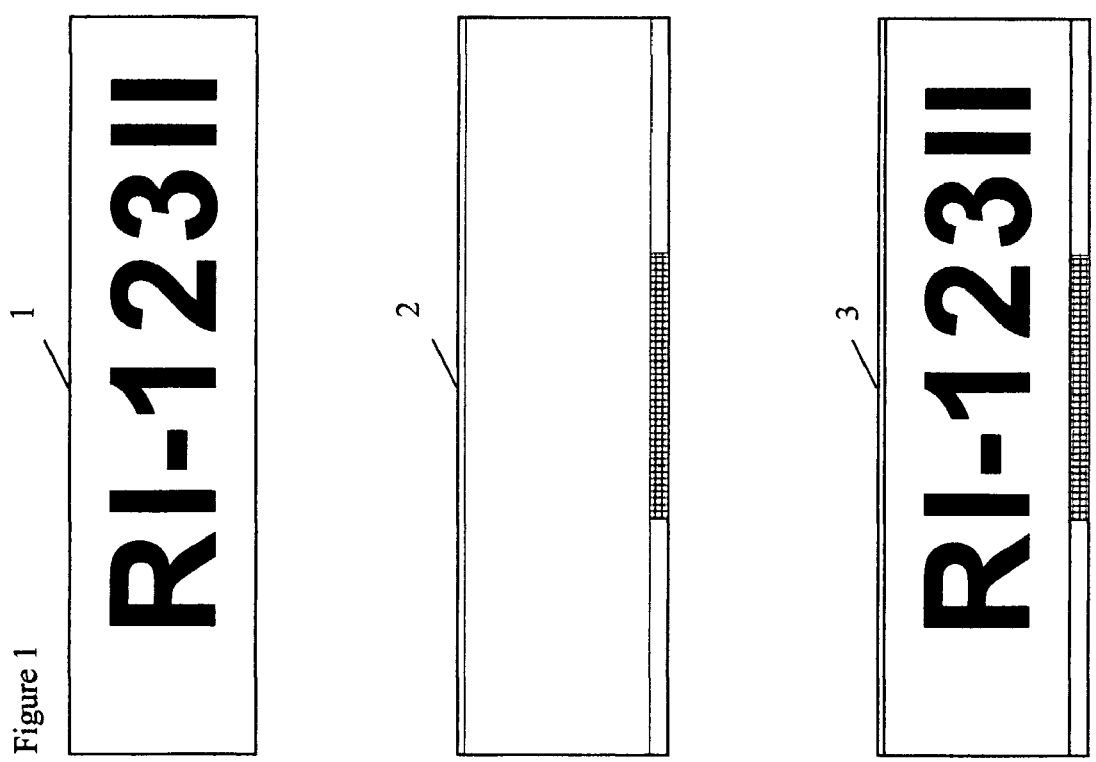

Referring to FIG. 1 there is shown that the registration plate (3, 3A) is formed of two parts: active screen for display (1, 1A) and, solar housing (2, 2A) that has built in source of electrical energy needed for normal functioning of the plates.

Figure 2:
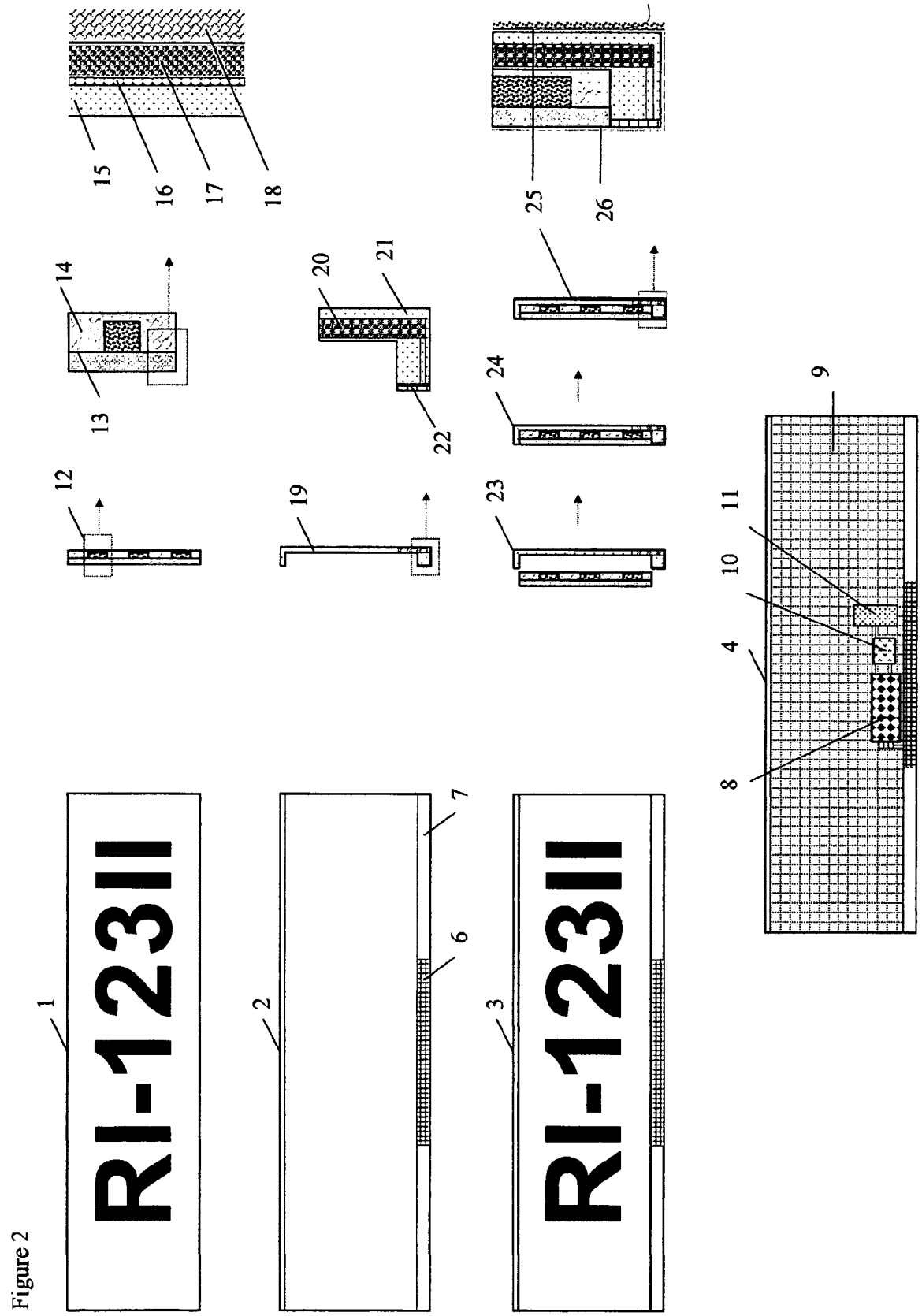
FIG. 2. shows front and side/cross view of the active display, solar housing and fully assembled wireless electronic registration plate, in accordance with the present invention.

Referring to FIG. 2, in an exemplary embodiment, there is shown that the active screen for display (1, 12) is made of two flexible parts. For the first flexible part (13) an E-ink/E-paper display module is used which consist of basically two layers. The first layer, Front Plane Laminate—FPL (17) contains electronic ink which is embodied by the second layer, i.e. surface plastic film (15) that contains transparent conducting electrodes (16). Lower surface of the first flexible part is covered with a sticking layer that enables for direct affixing on to a second flexible part, Back Plane Laminate i.e. Thin Film Transistor—TFT Backplane (14, 18), a thin base made of flexible plastic or metal/alloy sheet with built in electronics. Display on the screen is controlled by electronic complex (9) which includes a control chip and driver for text and graphics named—a control module (10). Within electronic complex there is also a wireless module i.e. chip (11) which serves to establish the wireless connection between the source of data input (table computer, portable PC, notebook, or any other electronic equipment for data input) and the electronic complex by following the according data transfer software protocol. The solar housing (2, 19) is made of transparent, flexible plastic that is so profiled (cradle-like) as to allow for the active screen for display to be affixed/embedded into it (23), so the two make the one as a whole (24). In a lower part of the solar housing (7) a solar module is placed, which consist of solar cells (6, 22) made of thin, flexible plastic film connected to the thin, rechargeable battery (8, 20) embedded into a solar housing wall or, connected directly to the electronic complex of the active screen for display. Solar cells produce enough electrical energy for direct supply of the electronic complex, wireless module or the battery charging. In the present innovation, for solar module as well as for the solar rechargeable battery the most innovative materials and products were used like the ones that can already be found on the market or, that are in final phase of production such as Power Film Modules and Thin Film Batteries.

Once assembled, the registration plate (3, 4)) is then additionally laminated as a whole, i.e. an additional layer of transparent, highly protective plastic is applied (26) for further protection. On the back surface of the assembled registration plate a double-sided, acrylic/epoxy tape is then attached (25) such as 3M high quality epoxy tape that can be found on the market. A free side of the double sided tape is covered by removable cover sheet that can be peeled off and the registration plate then stuck/glued onto a surface of vehicle. In this way the registration plates can be simply mounted/affixed by use of high quality glue, directly onto a vehicle body and bumpers (during the vehicle production) or, afterwards (as in transitional variant) onto the existing plate holders.

Figure 3:
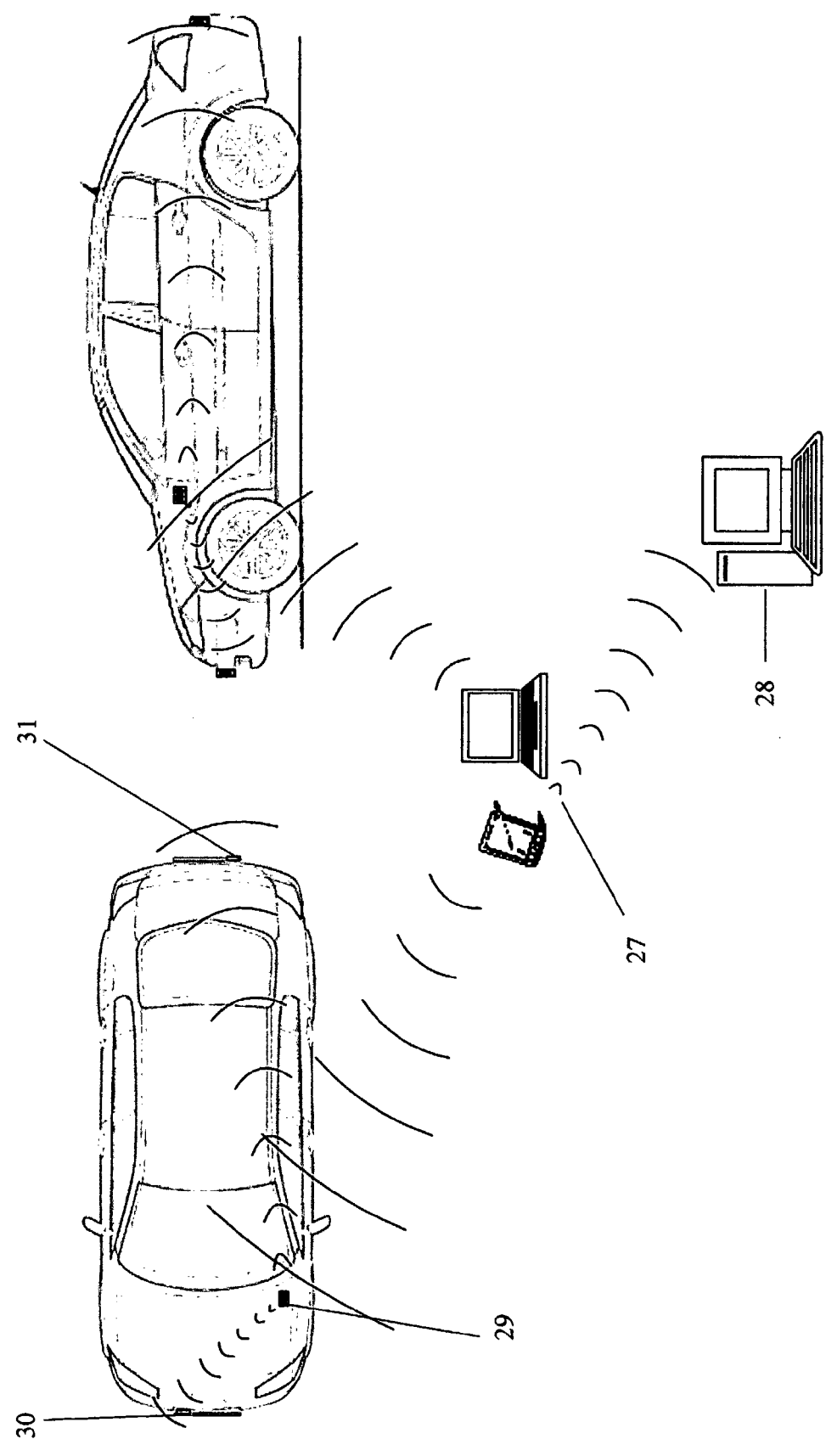
FIG. 3. is a schematic view of a vehicle having the wireless electronic registration plates and a process of wireless data transmission from data input sources to the central wireless module (vehicle) and the satellite wireless modules (registration plates) through Piconet network.

Referring to FIG. 3, in accordance with the present innovation, a wireless module i.e. Bluetooth chip that is placed in the front and the rear registration plates functions on a system of micro network or Piconet, whereas the central wireless module (29) can be placed anywhere within the vehicle where there is a possibility of direct, cable connection to an electric energy source. The central wireless module can be installed during the vehicle assembly or afterwards, and connected to the existing source of electrical energy in the vehicle (storage battery). With direct installation during the vehicle production process the central wireless module can be built in a central computer in the vehicle as, for example, in a Connected Drive wireless system that BMW presented recently with its newest model. The central wireless module is also called a main module or master and the ones fitted in the front and rear plates are satellite modules (30, 31) i.e. slaves. As and if needed, additional satellite modules can be added (for example with trucks, trailers etc.)

The wireless data transfer is established between the main wireless module (29) and the source of data input (27) according to usual protocol (Bluetooth synchronization protocol). If the plates are mounted in the vehicle factory, the main wireless module shall have a chassis number of the concerned vehicle pre-stored i.e. Vehicle Identification Number—VIN. If the plates are used as in transitional variant (mounting on existing plate holders) then the VIN number from owner's vehicle book is stored in the main wireless module. Each registration plate in its control module has stored information about its dimensions which will be recognized during the synchronization phase with the source of data input and shall be visible on the computer screen. All activities related to connection, data input, changing of a data, updating etc. are handled by an authorized person from the department of motor vehicle registration or other appropriate government body. The authorized person, who is registered with the central registration office and has a unique ID number (code), should be the only official able to have access to the input procedure and to modify the information. Every entry and data modification is registered in the data base with the central registration office and the reason for such entry or modification is recorded (for example with bigger vehicle failures, damaged vehicle and damage or destruction of the registration plates, extension of the registration etc.) When the wireless enabled portable computer or other electronic device from the authorized person recognizes the main wireless module and gets synchronized with it, the wireless link with the specific vehicle is open and ready for data transfer. In the computer there is software with interfaced data base or direct access to central registration data base that contains complete information about all registered vehicles on the territory of the concerned country (28).

The authorized person then using applicable software, and according to available alphanumeric registration numbers and/or specific owner's wish but in accordance with legally approved and recognized format of registration plates for the concerned country, selects one and fills in an electronic sample of the chosen plate on his/her computer. The software enables for some optionals such as: different colors of the plates' background, exceptional alphanumerical signs, for example EU or some other country/region specific coat of arms and/or additional insignias that are being used in the vehicle owner's domicile country. Similar software packages have been in use already, mostly with the registration plate's manufacturers and with the Internet based companies for registration plates order and purchase. Incorporated in the software there is an option that allows for storing a selected design onto the registration plates with different dimensions (usually it is the rear registration plate that is larger or square like, as in off-road vehicles, trailers and similar). This is achieved in such a way that on the computer screen the selected display is attached to each specific plate (slave/satellite module 1—dimension 1, slave/satellite module 2—dimension 2 and so on). The definite, chosen version of selected registration plate is visible on the computer screen and ready for transfer on to the main wireless module and through it on all other satellite wireless modules.

The authorized person effectuate the transfer of the selected display onto the central wireless module (master) which synchronizes with other wireless modules that have the same VIN number stored in their memory. After the completion of the data transfer the central wireless module switches into a parking mode i.e. stays synchronized with satellite wireless modules. The satellite wireless modules are in a sniff mode i.e. send a signal to central module in predetermined time intervals, which enables them to keep in constant contact with the central module. When there is no connection with the central module or there is no response from it as, for example, in situation when satellite modules are out of reach of the central module (theft), the control modules in the registration plates automatically forward the order to electronic complex to erase the existing display and to lock the electronic display. The central/main wireless module comes also with the control module which serves to lock the central module should the one gets disconnected from the source of energy supply (vehicle burglary), thus preventing for unauthorized, repetitive data input.

SOLUTIONS FOR APPLICATION OF THIS INVENTION

It is important to note that the above described way of carrying out the invention is only one of the possible variants of this present invention considering that either motor vehicles or, other transportation means are in question. The presented way of manufacture and application of the present innovation introduces significant improvements in relation with existing solutions on the market and generally lowers the total costs of the registration process. The registration process is simplified as a whole and quicker by the use of new materials, technology of the selection, transfer and modification of the registration data and, allows for an easy and controlled access to the most basic registration information of the registered vehicle. For example, the traffic police could be in a position to have access to the most basic information about the related vehicle and its owner by simply using wireless enabled electronic device with limited (restricted) access, which should enable them for easy tracking and traffic control. Through software controlled options and limited possibility of complete read out of the registration data without previous authorization, the access to the full information would be restricted and/or manipulation/modification of sensitive information would be made impossible. Although the present innovation introduces the registration plates as fully independent, self-acting functional units it also fully eliminates the possibility of their theft and/or misuse. The process of direct affixing during the manufacturing of the vehicles eliminates completely unnecessary actions from the side of the owner of a vehicle as well as the process of ordering, delivering and mounting of the plates. With the transitional variant, for the vehicles with existing, old registration plates, the mounting of the plates is very simplified (gluing the plates onto a plate holders) and with symbolic, one time only cost for installation of the central/main wireless module. The central module with connection to electrical supply is installed without need for significant mechanical/electrical changes or additional technological/technical solutions. It will be understood that various omissions and substitutions and changes in the form and details of the disclosed invention may be made by those skilled in the art without departing from the spirit of the invention. It is intention, therefore, to be limited only as indicated by the scope of the claims appended hereto.

The invention claimed is:

1. A system of wireless electronic registration plates comprising a central wireless module built in an area within a transport means having wiring of the central module with an electric energy source and, the electronic registration plates that are independently powered by solar cells, wherein the registration plates have built-in wireless communication chips as to enable receiving of, updating and sending data to a data source as well as between the central wireless module and satellite wireless modules that are placed in the electronic registration plates, and electronic paper technology is used for displaying for displaying of the data on the registration plates.

2. The system of wireless electronic registration plates of claim 1, wherein the said wireless electronic registration plates are formed of two functional parts: an active display and a solar housing, which together form an inseparable unit.

3. The system of wireless electronic registration plates of claim 2, wherein the active display is made of two flexible parts.

4. The system of wireless electronic registration plates of claim 3, wherein for the first flexible part a display module made of electronic paper is used, which consist of two layers, front plane laminate and back plane laminate.

5. The system of wireless electronic registration plates of claim 4, wherein the front plane laminate consist of a layer of electronic ink embodied within a plastic film layer containing transparent conducting electrodes.

6. The system of wireless electronic registration plates of claim 4, wherein the back plane laminate is made of flexible plastic or metal/alloy sheet and the back plane laminate contains an electronic complex that controls the displayed information.

7. The system of wireless electronic registration plates of claim 6, wherein the electronic complex in the back plane laminate contains a control module having a chip with memory and a driver for text and graphics and, a wireless module having a chip for enabling wireless communication and data transfer.

8. The system of wireless electronic registration plates of claim 1, wherein the central wireless module consist of a wireless chip and electronics suitable for wiring of the module with an electric energy source within the transport means.

9. The system of wireless electronic registration plates of claim 2, wherein the solar housing is made of transparent, flexible plastic that is so profiled as to allow for the active screen for display to be affixed/embedded into the electronic registration plates as an integrated structure.

10. The system of wireless electronic registration plates of claim 9, wherein a solar module, which consist of solar cells made of thin, flexible plastic film connected to a thin, rechargeable battery that is embedded into the solar housing wall behind the solar module, is placed in a lower part of the solar housing.

11. The system of wireless electronic registration plates of claim 10, wherein for the supply of electric energy to the satellite modules the thin film batteries are used which are placed in the back of the housing, wherein electrodes are in contact with the respective contact areas in the back of the back plane laminate of the active display, that is affixed into the solar housing.

12. The system of wireless electronic registration plates of claim 1 or 2, wherein the assembled registration plates are additionally laminated as a whole with an additional layer of highly protective plastic for further protection.

13. The system of wireless electronic registration plates of claim 12, wherein on the back surface of the registration plates a double-sided, acrylic/epoxy tape is attached which enables for affixing/gluing of the registration plates on to the transport means body surface, bumpers or registration plate holders.

14. The system of wireless electronic registration plates of claims 1 or 2, wherein said wireless electronic registration plates are configured into a form, pattern and size of existing standardized registration plates adapted for placement internally or externally to a transport means and capable of storing or displaying registration information.

15. The system of claim 14, wherein said wireless electronic registration plates are configured to combine with additional wireless electronic registration plates adapted for placement internally or externally to a transport means.

16. The system of claim 14, wherein said additional wireless electronic registration plates are configured into a form, pattern and size of existing standardized registration plates and capable of storing or displaying registration information.

* * * * *